United States Patent [19]

Wada et al.

[11] Patent Number: 5,155,333
[45] Date of Patent: Oct. 13, 1992

[54] LOW HYDROGEN TYPE COATED ELECTRODE

[75] Inventors: Takashi Wada, Yokohama; Shouzou Naruse, Fujisawa; Tomoyuki Abe, Yokohama, all of Japan

[73] Assignee: Kabushiki Kaisha Kobe Seiko Sho, Kobe, Japan

[21] Appl. No.: 733,819

[22] Filed: Jul. 22, 1991

[30] Foreign Application Priority Data

Jul. 24, 1990 [JP] Japan .................................. 2-19531

[51] Int. Cl.$^5$ ............................................. B23K 35/22
[52] U.S. Cl. .............................. 219/145.23; 219/146.1
[58] Field of Search ........... 219/146.1, 146.22, 146.24, 219/146.3, 146.31, 146.52, 137 W M, 145.23

[56] References Cited

U.S. PATENT DOCUMENTS 3,566,073  2/1971  Black ........................ 219/137 W M
4,149,063  4/1979  Bishel ............................ 219/146.31

Primary Examiner—Clifford C. Shaw
Attorney, Agent, or Firm—Oblon, Spivak, McClelland, Maier & Neustadt

[57] ABSTRACT

Disclosed herein is a low hydrogen type coated electrode comprising a steel core wire entirely coated with a coating agent, wherein the coating agent contains, by weight, 35–55% $CaCO_3$, 1–4% $SrCO_3$, 1.5–4% $CaF_2$, 1–5% $TiO_2$, 5–12% $SiO_2$, 3–9% Si, 1–6% Mn and 15–40% Fe and fulfills the following relationships:

$$CaCO_3/CaF_2 = \text{from 9 to 25, and}$$

$$Fe/CaF_2 = \text{from 5 to 22.}$$

The low hydrogen type coated electrode produces excellent effects particularly when applied to downward welding for circumferential butt joints of pipes.

3 Claims, 1 Drawing Sheet

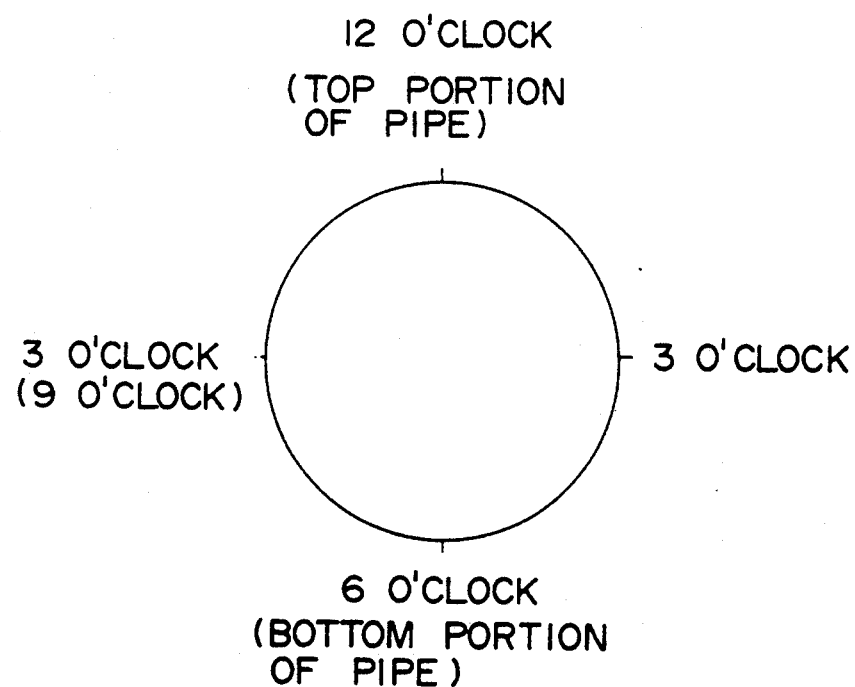

LOW HYDROGEN TYPE COATED ELECTRODE

BACKGROUND OF THE INVENTION (1) Field of the Invention

This invention relates to a low hydrogen type coated electrode, and more particularly to a low hydrogen type coated electrode which produces excellent effects when applied to downward welding for circumferential butt joints of pipes.

(2) Description of the Prior Art

Site welding of circumferential butt joints in pipelines has conventionally been carried out by downward welding techniques using coated electrodes, which have been of the low hydrogen type or ilmenite type in Japan and of the cellulose type in other countries. Because hydrogen-induced cracking is a major problem in welding of high-tensile steel pipes, especially in the case of site welding carried out in a cold place, it is desirable to use low hydrogen type coated electrodes. However, it has been very difficult to achieve downward welding by use of the conventional low hydrogen type coated electrodes.

To overcome the above difficulties, the present inventors have previously proposed Japanese Patent Publication No. 56-21519 (1981).

However, the low hydrogen type coated electrode according to the above-mentioned proposal, though having far more excellent performance as compared with the previous ones, are yet unsatisfactory and need improvements in view of the recent requests for higher efficiency and performance for use under severer conditions.

That is, when the low hydrogen type coated electrode according to the above proposal is used for downward welding of a circumferential butt joint in a piping, the conformability of the bead to the parent metal may become insufficient in welding the portion ranging from 4.5 to 6 o'clock (8.5 to 6 o'clock) positions as shown in FIG. 1. The insufficient conformability necessitates after-treatments such as grinder work.

SUMMARY OF THE INVENTION

This invention contemplates a solution to the aforementioned problems in the prior art.

It is accordingly an object of this invention to provide a low hydrogen type coated electrode which enables downward welding in any welding position, as well as downward welding of circumferential butt joints in pipes at portions ranging from 4.5 to 6 o'clock (8.5 to 6 o'clock) positions, and ensures an enhanced efficiency.

In order to solve the above-mentioned problems, the present inventors have made extensive studies of measures to enhance the efficiency in welding and to prevent the conformability of the bead to the parent metal from becoming worse at specified welding positions (from 4.5 to 6 o'clock, or from 8.5 to 6 o'clock positions). As a result of the studies, this invention has been attained.

According to this invention, there is provided a low hydrogen type coated electrode comprising a steel core wire entirely coated with a coating agent, wherein the coating agent contains, by weight, 35–55% $CaCO_3$, 1–4% $SrCO_3$, 1.5–4% $CaF_2$, 1–5% $TiO_2$, 5–12% $SiO_2$, 3–9% Si, 1–6% Mn and 15–40% Fe and fulfills the following relationships:

$CaCO_3/CaF_2$ = from 9 to 25, and $Fe/CaF_2$ = from 5 to 22.

The low hydrogen type coated electrode according to this invention enables downward welding of circumferential butt joints of pipes to be carried out in any welding position, and ensures excellent conformability of the bead to the parent metal, especially at from 4.5 to 6 o'clock (8.5 to 6 o'clock) positions, thereby eliminating the need for after-treatments of welded joints, such as grinder work. Furthermore, the coated electrode of this invention produces other excellent effects such as an increase in efficiency.

The above, and other, objects, features and advantages of this invention will become apparent from the following description and appended claims, taken in conjunction with the accompanying drawing.

BRIEF DESCRIPTION OF THE DRAWINGS

FIG. 1 is an illustration, based on a clockface method, of the weld position in downward welding for a circumferential butt joint of pipes.

DESCRIPTION OF PREFERRED EMBODIMENTS

One of the characteristic features of the composition of the coating agent according to this invention is that Fe is added as an essential constituent in order to achieve higher efficiency. The amount of Fe added is much greater than that in the low hydrogen type coated electrode proposed in the aforementioned Japanese patent publication.

Although the addition of Fe is intended to enhance efficiency, the increase in efficiency by the addition of large amount of Fe has proved to be a cause of adverse effects on the conformability of the bead to the parent metal.

In order to solve this problem, this invention adopts the following fundamental means:

(a) decreasing the amount of $CaF_2$ added, (b) increasing the ratio of $CaCO_3/CaF_2$, and (c) specifying the ratio of $Fe/CaF_2$, whereby the conformability of the bead to the parent metal, in any welding position, is improved markedly.

The grounds for the limits set to the composition of the coating agent according to this invention will now be described below.

$CaCO_3$: 35–55%

$CaCO_3$ is added as a gas generating agent. When the amount of $CaCO_3$ is less than 35%, the amount of gas generated is too small to provide sufficient shielding, and the viscosity of the resulting slag is so low that pits are generated in the bead surface and, further, the conformability of the bead to the parent metal is poor at from 2 to 4 o'clock positions. When the amount of $CaCO_3$ exceeds 55%, on the other hand, the viscosity of the slag is increased conspicuously with the resultant poor conformability of the bead to the parent metal, and the gas is generated in an increased amount, causing a greater degree of spatter. Therefore, $CaCO_3$ is used in an amount of 35–55%, preferably 39–50%.

$SrCO_3$: 1–4%

$SrCO_3$ functions to enlarge the areas of craters and to improve the conformability of the bead to the parent metal. However, these effects cannot be obtained when the amount of $SrCO_3$ is less than 1%. When the amount is more than 4%, on the other hand, arc stability is lowered, leading to increased spatter, and release properties of slag is worsened. Therefore $SrCO_3$ is used in an amount of 1-4%, preferably 1-3%.

$CaF_2$: 1.5-4%

$CaF_2$ serves for controlling the viscosity and fluidity of slag. When the amount of $CaF_2$ is less than 1.5%, the effect is not obtained. Although $CaF_2$ amounts of not less than 1.5% ensure the formation of good bead at from 2 to 4 o'clock positions, a $CaF_2$ amount exceeding 4% renders the viscosity of slag comparatively lower and increases the fluidity of the slag, resulting in poor conformability of the bead to the parent metal at from 4.5 to 6 o'clock positions and at from 8.5 to 6 o'clock positions. The amount of $CaF_2$ is therefore in the range of 1.5-4%.

$TiO_2$: 1-5%, $SiO_2$: 5-12%

$TiO_2$ and $SiO_2$ are each added as a slag forming agent. A $TiO_2$ amount of less than 1% leads to poor conformability of the bead to the parent metal, whereas a $TiO_2$ amount of more than 5% increases the viscosity of slag, causing easier dripping of slag at from 2 to 4 o'clock positions. When the amount of $SiO_2$ is less than 5%, the extent of crater is small and the conformability of the bead to the parent metal be poor at from 2 to 4 o'clock positions. When the $SiO_2$ amount is more than 12%, on the other hand, slag inclusion is liable to occur, especially at from 2 to 4 o'clock positions, and a good bead cannot be obtained. Accordingly, the amount of $TiO_2$ is 1-5%, and the $SiO_2$ amount is 5-12%.

Besides, $TiO_2$ may be added as rutile or ilmenite, while $SiO_2$ may be added as silicate or silica sand.

Si: 3-9% Mn: 1-6%

Si and Mn are added as deoxidizers. When one or both of these elements are added in amounts less than the respective lower limits, the deoxidizing effect is not obtained, whereas an addition thereof in excess of the upper limits causes excessive deoxidation, thereby generating pits in the surface of the bead. Therefore, Si is added in an amount of 3-9%, preferably 3.5-7.5%, and the amount of Mn is 1-6%, preferably 1.8-5.2%. Besides, Si may be added as elemental silicon or in the form of Fe-Si, Si-Mn, Ca-Si or the like. Mn may be added as metallic manganese or in the form of Fe-Mn, Si-Mn or the like.

$CaCO_3/CaF_2$: 9-25

The ratio $CaCO_3/CaF_2$ has great effects on the viscosity and fluidity of slag, and is therefore an important factor in downward welding in any welding position. When the ratio is less than 9, the viscosity of slag is comparatively small and, as a result, operability is worsened at from 4.5 to 6 o'clock (8.5 to 5 o'clock) positions. Operability at from 2 to 4 o'clock positions is improved as the ratio is increased. However, when the ratio exceeds 25, the operability at from 4.5 to 6 o'clock (8.5 to 6 o'clock) positions is lowered and the conformability of the bead to the parent metal becomes poorer. Thus, the ratio $CaCO_3/CaF_2$ is in the range of 9-25, preferably 9.5-19.

Fe: 15-40%

Fe is added for enhancing deposition efficiency. The effect is slight when the amount of Fe added is less than 15%. On the other hand, an Fe amount exceeding 40% causes a relative decrease in the amount of slag formed, so that the covering property of the slag is lowered. Accordingly, Fe is used in an amount of 15-40%, preferably 18-36%.

$Fe/CaF_2$: 5-22

The addition of a comparatively large amount of Fe for attaining a higher deposition efficiency as mentioned above, on one hand, enables welding at high efficiency, but, on the other hand, constitutes a cause of poor conformability of the bead to the parent metal at from 4.5 to 6 o'clock positions and at from 8.5 to 6 o'clock positions. It has been found out that the lowering in the conformability can be obviated when the $Fe/CaF_2$ ratio is 5 or higher. If the ratio is less than 5, there would easily arise dripping, especially of the molten metal, and the conformability of the bead to the parent metal at the above-mentioned positions would not be improved. When the ratio exceeds 22, on the other hand, the extent of the crater becomes smaller. Thus, the $Fe/CaF_2$ ratio is in the range from 5 to 22, preferably from 5 to 18.

Besides, Ni, Cr, Mo or the like may be added in appropriate amounts in order to control the mechanical properties of the deposited metal. That is, Ni improves toughness and strength, and both Cr and Mo improve strength. To obtain such effect, it is desirable that Ni be added in an mount of up to 4.5%, Cr up to 2%, and Mo up to 5%. However, when Ni amounts of more than 4.5%, arc is so weak that weld penetration gets worse. An excess of Cr or Mo leads to deterioration of toughness.

Ti may be added in an amount of up to 5% since it serves as deoxidizers and improves concentrating and softening arc. However, when Ti amounts of more than 5%, the arc is so weak that weld penetration gets worse.

Further, B may be added in an amount of up to 0.2% since it improves wetting property relating to parent metal. However, when B amounts of more than 0.2%, arc is so weak that weld penetration gets worse.

In practice of this invention, water glass is ordinarily used as a binder. Water glass, containing $Na_2O$, $K_2O$ or the like components in some amounts, functions also as a slag forming agent and an arc stabilizer.

In this invention, the ratio of the cross sectional area of the coating agent to that of the steel core wire is determined suitably.

The following examples further illustrate this invention.

EXAMPLES

Steel core wires were coated respectively with coating agents having the compositions as set forth in Table 1, to prepare test welding electrodes.

Using each of the test welding electrodes, a butt joint (60° V groove) of horizontally fixed pipes (10.3 mm in material thickness, 1016 mm in diameter) was welded by a downward welding technique, and operability at each weld position was examined. The results are set forth in Table 2.

As is clear from Table 2, all of the test welding electrodes according to the Examples of this invention showed excellent operability in downward welding at every position.

On the other hand, the test welding electrode according to Comparative Example No. 12 showed poor conformability of the bead to the parent metal at 3 o'clock (9 o'clock) position due to the lower $CaCO_3$ content, and slightly poor conformability of bead at 6 o'clock position due to the low $CaCO_3/CaF_2$ ratio.

Comparative Example No. 13, with an excessively high $CaCO_3/CaF_2$ ratio, resulted in poor conformability of bead at 6 o'clock position.

In Comparative Example Nos. 14 and 15, slag stability and conformability of bead were poor at all positions.

Comparative Example No. 16 resulted in poor conformability of bead at 6 o'clock position, due to the low $Fe/CaF_2$ ratio.

Comparative Example No. 17, with a high $TiO_2$ content, did not give good conformability of bead at 3 o'clock (9 o'clock) position.

In Comparative Example No. 18, the conformability of bead was slightly poor at 3 o'clock (9 o'clock) position and 6 o'clock position, due to the lower $CaCO_3$ content.

Comparative Example 19, with a lower $Fe/CaF_2$ ratio, resulted in poor conformability of bead at 6 o'clock position.

In Comparative Example 20, slag stability and conformability of bead were good, but pits were generated in the bead surface because of the excessively large amount of deoxidizer.

In Comparative Example 21, the conformability of bead was good at 6 o'clock position but was slightly poor at 3 o'clock (9 o'clock) position.

Comparative Example No. 22, with a lower Mn content, resulted in generation of blowholes due to insufficient deoxidation.

TABLE 1

Coating agents for test welding electrodes
Composition of coating agent (wt. %)

| Test No. | $CaCO_3$ | $CaF_2$ | $SrCO_3$ | $TiO_2$ | $SiO_2$ | Si | Mn | Ti | Ni | Mo | B | M.Fe[1] | Other components[2] | $\dfrac{CaCO_3}{CaF_2}$ | $\dfrac{M.Fe}{CaF_2}$ | Remarks |
|---|---|---|---|---|---|---|---|---|---|---|---|---|---|---|---|---|
| 1 | 36.0 | 3.4 | 3.9 | 1.7 | 5.3 | 8.4 | 2.6 | 0.6 | — | — | — | 35.8 | 2.3 | 10.6 | 10.5 | Examples |
| 2 | 52.6 | 2.2 | 1.3 | 2.3 | 6.2 | 3.3 | 1.2 | — | — | — | — | 26.3 | 4.6 | 23.9 | 12.0 | of This |
| 3 | 43.8 | 3.8 | 2.5 | 1.2 | 11.7 | 6.1 | 5.4 | — | — | — | — | 21.6 | 3.9 | 11.5 | 5.7 | Invention |
| 4 | 39.6 | 1.8 | 2.9 | 1.9 | 7.1 | 3.9 | 2.1 | — | — | — | — | 39.2 | 1.5 | 22.0 | 21.8 | |
| 5 | 49.6 | 2.0 | 2.7 | 4.8 | 11.2 | 5.1 | 2.9 | 2.6 | — | — | — | 15.6 | 3.5 | 24.8 | 7.8 | |
| 6 | 44.2 | 3.1 | 2.2 | 3.5 | 6.7 | 4.6 | 3.8 | — | — | — | — | 28.1 | 3.8 | 14.3 | 9.1 | |
| 7 | 35.4 | 1.6 | 3.3 | 4.1 | 8.5 | 7.1 | 4.6 | — | — | — | — | 28.0 | 7.4 | 22.1 | 17.5 | |
| 8 | 39.6 | 2.8 | 1.7 | 3.2 | 5.8 | 8.7 | 3.4 | — | — | — | — | 28.6 | 6.2 | 14.1 | 10.2 | |
| 9 | 37.8 | 2.6 | 3.6 | 2.1 | 6.8 | 4.2 | 2.7 | — | 3.0 | — | — | 31.9 | 5.3 | 14.5 | 12.3 | |
| 10 | 48.0 | 2.0 | 1.8 | 1.9 | 7.2 | 4.0 | 1.9 | — | — | 2.0 | — | 25.3 | 5.9 | 24.0 | 12.7 | |
| 11 | 43.9 | 3.0 | 2.2 | 3.4 | 5.8 | 4.1 | 5.7 | 1.2 | — | — | 0.17 | 28.1 | 2.43 | 14.6 | 9.4 | |
| 12 | 33.1 | 4.8 | 3.4 | 2.6 | 5.9 | 7.6 | 2.8 | — | — | — | — | 33.7 | 6.1 | 6.9 | 7.0 | Comparative |
| 13 | 57.0 | 2.0 | 1.5 | 1.9 | 6.2 | 3.5 | 1.4 | — | — | — | — | 22.3 | 4.2 | 28.5 | 11.2 | Examples |
| 14 | 36.2 | 0.8 | 5.5 | 4.1 | 9.8 | 6.2 | 3.7 | — | — | — | — | 30.4 | 3.3 | 45.3 | 38.0 | |
| 15 | 38.6 | 2.7 | 0.2 | 0.4 | 8.6 | 1.4 | 1.5 | — | — | — | — | 43.5 | 3.1 | 14.3 | 15.4 | |
| 16 | 53.9 | 3.9 | 3.8 | 4.8 | 3.4 | 8.6 | 5.3 | — | — | — | — | 12.1 | 4.2 | 13.8 | 3.1 | |
| 17 | 41.6 | 1.8 | 2.1 | 6.5 | 5.4 | 4.2 | 2.7 | — | — | — | — | 32.5 | 3.2 | 23.1 | 18.1 | |
| 18 | 32.5 | 3.8 | 3.9 | 4.6 | 8.8 | 6.1 | 4.6 | — | — | — | — | 30.7 | 5.0 | 8.6 | 8.1 | |
| 19 | 51.5 | 3.7 | 1.9 | 2.9 | 13.1 | 8.1 | 1.1 | — | — | — | — | 13.6 | 4.1 | 13.9 | 3.7 | |
| 20 | 43.2 | 2.1 | 2.8 | 3.3 | 5.7 | 3.6 | 7.5 | — | — | — | — | 27.2 | 4.6 | 20.6 | 13.0 | |
| 21 | 47.2 | 2.0 | 2.9 | 1.3 | 3.4 | 10.5 | 3.2 | — | — | — | — | 26.3 | 3.2 | 23.6 | 13.2 | |
| 22 | 46.8 | 2.9 | 1.6 | 3.9 | 6.5 | 8.7 | 0.2 | — | — | — | — | 25.2 | 4.2 | 16.1 | 8.7 | |

Notes
[1] Percent metallic iron inclusive of Fe from Fe—Mn, Fe—Si, Fe—Ti, Fe—Mo. etc.
[2] $Na_2O$, $K_2O$, etc.

TABLE 2

Operability in welding
Evaluation of operability in welding at each weld position

| Test No. | Stability of slag | | | Conformability of bead | | | Total evaluation | Remarks |
|---|---|---|---|---|---|---|---|---|
| | 12 o'clock | 3(9) o'clock | 6 o'clock | 12 o'clock | 3(9) o'clock | 6 o'clock | | |
| 1 | ○ | ○ | ○ | ○ | ○ | ○ | good | Examples |
| 2 | ○ | ○ | ○ | ○ | ○ | ○ | good | of This |
| 3 | ○ | ○ | ○ | ○ | ○ | ○ | good | Invention |
| 4 | ○ | ○ | ○ | ○ | ○ | ○ | good | |
| 5 | ○ | ○ | ○ | ○ | ○ | ○ | good | |
| 6 | ○ | ○ | ○ | ○ | ○ | ○ | good | |
| 7 | ○ | ○ | ○ | ○ | ○ | ○ | good | |
| 8 | ○ | ○ | ○ | ○ | ○ | ○ | good | |
| 9 | ○ | ○ | ○ | ○ | ○ | ○ | good | |
| 10 | ○ | ○ | ○ | ○ | ○ | ○ | good | |
| 11 | ○ | ○ | ○ | ○ | ○ | ○ | good | |
| 12 | ○ | X | Δ | ○ | X | Δ | bad | Comparative |
| 13 | ○ | Δ | X | Δ | Δ | X | bad | Examples |
| 14 | X | X | X | X | X | X | bad | |
| 15 | X | X | X | X | X | X | bad | |
| 16 | ○ | Δ | X | ○ | Δ | X | bad | |
| 17 | ○ | X | Δ | ○ | Δ | ○ | bad | |
| 18 | ○ | Δ | Δ | ○ | Δ | Δ | bad | |
| 19 | ○ | Δ | Δ | Δ | X | X | bad | |
| 20 | ○ | ○ | ○ | ○ | ○ | Δ | bad | |
| 21 | ○ | Δ | ○ | ○ | Δ | ○ | bad | |

TABLE 2-continued

| Test No. | Operability in welding | | | | | | Total evaluation | Remarks |
|---|---|---|---|---|---|---|---|---|
| | Evaluation of operability in welding at each weld position | | | | | | | |
| | Stability of slag | | | Conformability of bead | | | | |
| | 12 o'clock | 3(9) o'clock | 6 o'clock | 12 o'clock | 3(9) o'clock | 6 o'clock | | |
| 22 | ○ | ○ | Δ | ○ | Δ | Δ | bad | |

Note: Evaluation of operability in welding: ○-good, Δ-slightly poor, X-poor

As has been detailed above, according to this invention it is possible to achieve welding in any welding position, particularly in downward welding for circumferential butt joints of pipes, to give excellent conformability of the bead to the parent metal, especially at from 4.5 to 6 o'clock (8.5 to 6 o'clock) positions, thereby eliminating the need for after-treatments of the welded joints, such as grinder work. This invention provides further excellent effects such as a higher efficiency.

What is claimed is:

1. A low hydrogen type coated electrode comprising a steel core wire entirely coated with a coating agent, wherein the coating agent contains, by weight, 35–55% $CaCO_3$, 1–4% $SrCO_3$, 1.5–4% $CaF_2$, 1–5% $TiO_2$, 5–12% $SiO_2$, 3–9% Si, 1–6% Mn and 15–40% Fe and fulfills the following relationships:

$CaCO_3/CaF_2$ = from 9 to 25, and $Fe/CaF_2$ = from 5 to 22.

2. A low hydrogen type coated electrode comprising a steel core wire entirely coated with a coating agent, wherein the coating agent contains, by weight, 35–55% $CaCO_3$, 1–4% $SrCO_3$, 1.5–4% $CaF_2$, 1–5% $TiO_2$, 5–12% $SiO_2$, 3–9% Si, 1–6% Mn, 15–40% Fe, 5% or less Ti and 0.2% or less B and fulfills the following relationships:

$CaCO_3/CaF_2$ = from 9 to 25, and $Fe/CaF_2$ = from 5 to 22.

3. A low hydrogen type coated electrode comprising a steel core wire entirely coated with a coating agent, wherein the coating agent contains, by weight, 35–55% $CaCO_3$, 1–4% $SrCO_3$, 1.5–4% $CaF_2$, 1–5% $TiO_2$, 5–12% $SiO_2$, 3–9% Si, 1–6% Mn, 15–40% Fe, 5% or less Ti, 0.2% or less B and 4.5% or less Ni and fulfills the following relationships:

$CaCO_3/CaF_2$ = from 9 to 25, and $Fe/CaF_2$ = from 5 to 22.

* * * * *

UNITED STATES PATENT AND TRADEMARK OFFICE
CERTIFICATE OF CORRECTION

PATENT NO. : 5,155,333
DATED : October 13, 1992
INVENTOR(S) : Takashi Wada et al.

It is certified that error appears in the above-identified patent and that said Letters Patent is hereby corrected as shown below:

On Title page, Item [30], Foreign Application Priority Data, should read as follows:  --Jul. 24, 1990  [JP]  Japan..................2-195531--.

Signed and Sealed this

Fourteenth Day of September, 1993

Attest:

BRUCE LEHMAN

Attesting Officer

Commissioner of Patents and Trademarks